Figure 1:
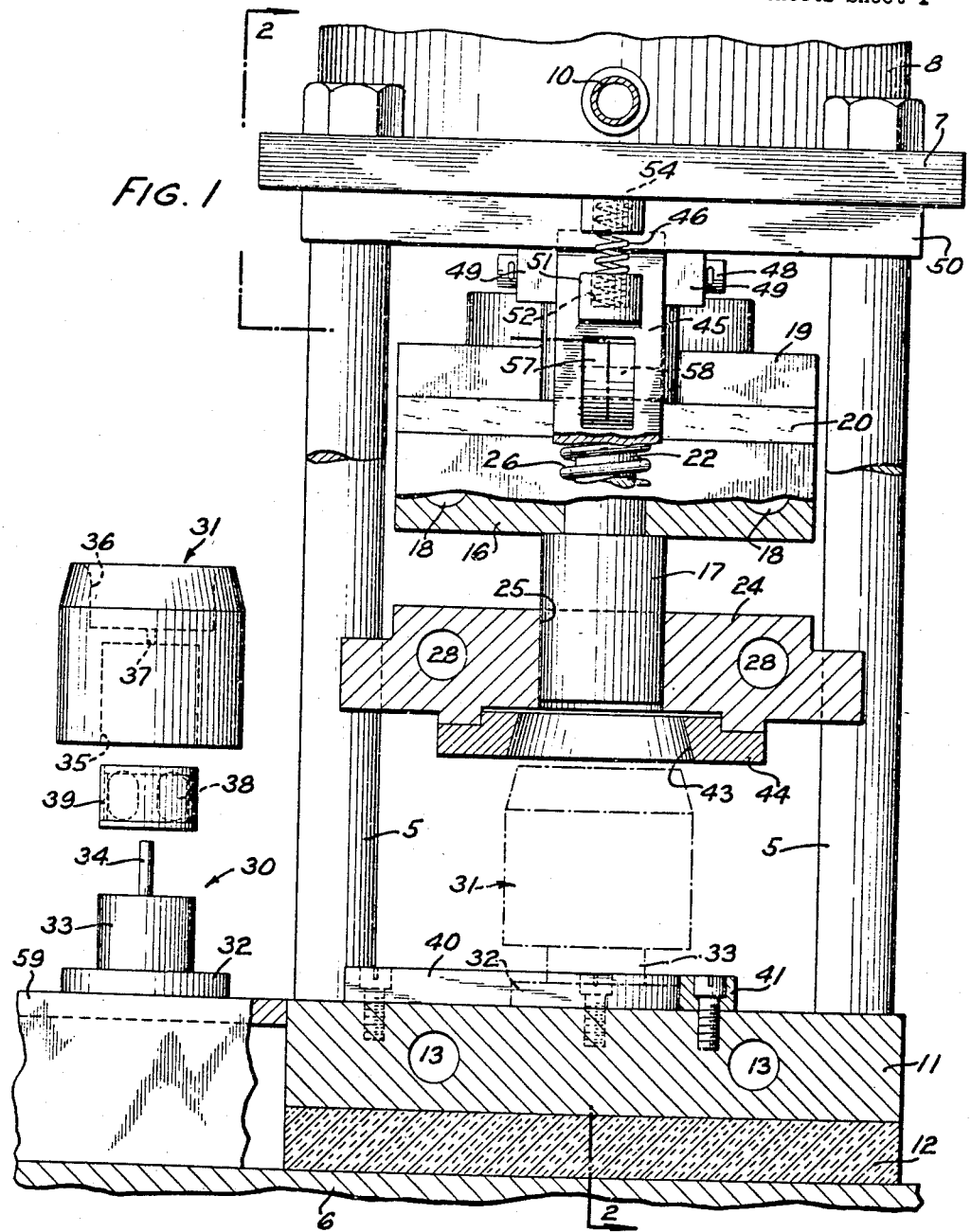

Feb. 19, 1946.  A. J. BRUNNER  2,395,316
MOLDING APPARATUS
Filed Dec. 11, 1943   2 Sheets-Sheet 1

INVENTOR
A. J. BRUNNER
BY Harry L. Duft
ATTORNEY

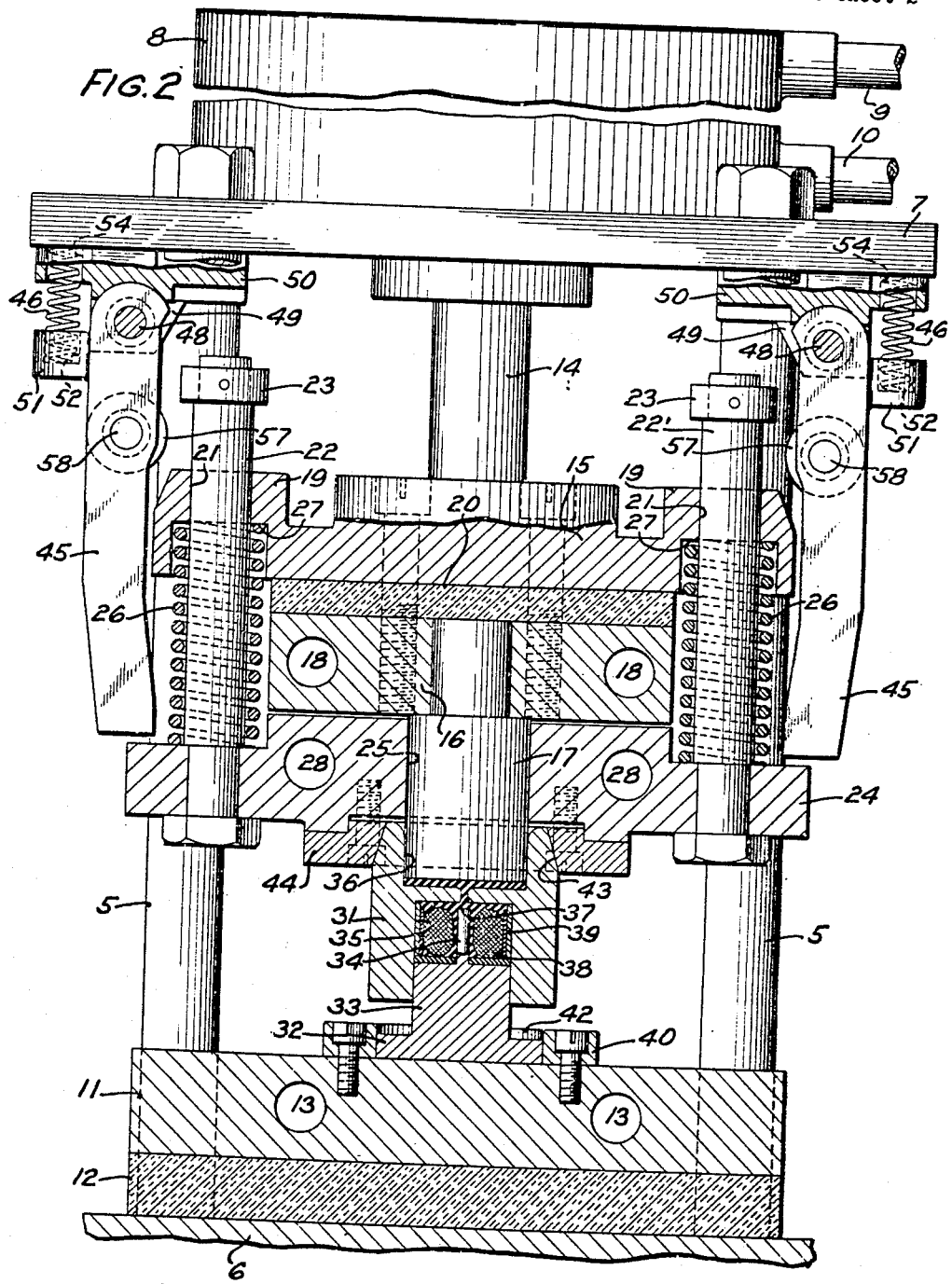

Patented Feb. 19, 1946

2,395,316

UNITED STATES PATENT OFFICE 2,395,316

MOLDING APPARATUS

Anton J. Brunner, Congress Park, Ill., assignor to Western Electric Company, Incorporated, New York, N. Y., a corporation of New York Application December 11, 1943, Serial No. 513,876

6 Claims. (Cl. 18—30)

This invention relates to molding apparatus and more particularly to an apparatus for extrusion molding an article of plastic or plasticizable material.

In the manufacture of some types of molded articles, particularly of articles wherein an insert is positioned within a shell and the shell filled with soft rubber to serve as insulation for the article and to protect it from moisture, it is sometimes the practice to employ a multi-cavity extrusion molding apparatus and to mold simultaneously a large number of parts. However, where the parts to be placed in the cavities are not always perfectly uniform in size or shape, it may be more desirable to mold the rubber thereover using a single-compartment die whereby allowances may be made for slight variations in the size of the inserts or shells.

An object of the present invention is to provide an efficient and effective apparatus for extrusion molding articles of plastic or plasticizable material.

In accordance with one embodiment of this invention, a molding apparatus for extruding soft rubber is provided wherein a sectional mold is used, the upper section of which has the extrusion chamber wholly formed therein. The mold is movable as a unit under the extrusion plunger and is stripped therefrom at the completion of the molding operation.

Other objects and advantages of the present invention will be more apparent from the following detailed description taken in conjunction with the drawings, wherein Fig. 1 is a side elevation, partly in section of a molding apparatus constructed in accordance with this invention including a detailed view of the molding die with the elements thereof spaced apart; and Fig. 2 is a vertical sectional view along the line 2—2 of Fig. 1.

Referring now to the drawings, a molding apparatus is there shown comprising four parallel, upright standards 5 which are spaced apart and mounted on a table 6. A cross plate 7 is fixed to the upper ends of these standards and supports on its upper side a pressure chamber 8 in which is disposed the upper end of a ram 14. Air is supplied to the chamber 8 through two lines 9 and 10, the upper line being used when it is desired to move the ram downwardly and the lower when it is desired to move the ram upwardly. A base block 11 is positioned at the lower ends of the standards 5 and is mounted on the table 6, being separated therefrom by a layer 12 of suitable heat insulating material. This base block is heated by passing steam or heated gases through a number of apertures 13 formed therein.

The lower end of the ram 14, which extends through and is movable relatively to the cross plate 7, is fixed to the upper side of a bolster plate 15 which is vertically movable therewith. This plate 15 supports on its underside a block 16 in which is mounted the upper portion of an extrusion ram 17. The block 16 is heated similarly to the block 9 by passing steam through a number of apertures 18 formed therein and which extend therethrough. The block 16 is separated from the bolster plate 15 by a layer of heat insulating material 20.

As may be seen in Fig. 2, two opposing sides of the bolster plate 15 are extended to form two ledge portions 19 which are provided with vertically extending apertures 21 in which a pair of posts 22 are slidably mounted. Collars 23 are fixed to the upper ends of these posts and are engaged by the upper sides of the portions 19 during the upward travel of the ram 14 to move the posts upward. The lower ends of the posts 22 are enlarged to support a heavy stripper plate 24, the posts 22, however, being movable downwardly relatively thereto. The ram 17 extends through an aperture 25 formed in the central portion of the stripper plate 24, the ram being vertically movable through this aperture relatively to the stripper plate. Helical springs 26 are positioned about the posts 22 and their lower ends bear against the upper side of the stripper plate 24 while their upper ends are received in recesses 27 formed in the underside of the extended portions 19 of the bolster plate 15. Since the springs 26 are normally under compression, the stripper plate 24 is always urged to its lowermost position relatively to the ram 17. Thus, when the ram 17 is raised into the position shown in Fig. 1, the stripper plate 24 will tend to remain substantially stationary relatively to the ram 17 during the initial upward movement of the ram 14 which carries with it the ram 17. Apertures 28 are provided in the plate 24 through which steam may be circulated to heat the plate. Since both the plate 24 and the block 16 are heated, it will be understood that the extrusion ram will be maintained thereby at the required temperature.

In order to provide a light and easily loaded molding die, a sectional molding die is employed comprising a lower section 30 and an upper section 31. The lower section itself is formed in three portions: a base 32, a cylindrical block 33 mounted thereon and integral therewith, and a pin 34 mounted on the upper side of the cylindrical block and extending vertically therefrom. The purpose of this pin will be explained hereinafter. The upper die section has a molding cavity 35 formed in the lower portion thereof in which the cylindrical portion 33 of the lower die member is receivable and an extrusion chamber 36 formed in the upper portion thereof, as shown in Fig. 2, in which the ram 17 is receivable. An extrusion aperture 37 connects the extrusion chamber with the molding cavity 35.

The particular apparatus illustrated is intended for use in molding soft rubber about loading coils 38 such as commonly used in the telephone art. One practice in providing a protective housing for such coils which has met with considerable success has been to position the coils within a shell 39 and then to extrude soft rubber into the shell to completely surround the coils and thus to render them water-proof. It has been found that in using ordinary molding apparatus wherein the soft rubber is extruded under considerable force into the chamber formed by the shell that the coils are sometimes deformed by the rubber as it is extruded therein. In order to prevent this, the pin 34 is provided. When the coils and shell are assembled in the mold and the sections of the mold are clamped together, as shown in Fig. 2, the upper end of the pin 34 is positioned a short distance below the lower end of the extrusion aperture 37 of the upper die section. Thus, as molding material is extruded into the chamber, the material is deflected by the pin and the force of flow of the material is largely reduced thereby so that, as the molding material disposes itself within the chamber 35, it does so without damage to the coils.

In the operation of this apparatus, after a coil and shell have been assembled within the molding die and the sections of the molding die put together, a quantity of molding material is placed in the extrusion chamber 36. This assembly operation may be performed on a platform 59 mounted on the table 6 adjacent the base block 11 and on a level therewith. A suitable heating means, such as an oven, may be provided on the platform 59 to maintain the die sections at the desired molding temperature. After the required quantity of molding material has been placed in the extrusion chamber, the molding die is then slid along the platform 59 and the upper side of the base block 11 into position under the extrusion ram 17. As the molding die is slid into the position under the extrusion ram, it is guided in its movement by a pair of spaced parallel retaining bars 40 which are mounted on the upper side of the block 9 and by a cross bar 41 mounted between the right ends of the bars 40, as viewed in Fig. 1, so as to serve as a stop. The bars 40 are each provided with an inwardly extending portion 42 which extends over the upper side of the base member 32 of the lower die section, as shown in Fig. 2, to retain the die on the base block 11.

During the initial downward movement of the bolster plate 15, after the pressure ram 14 has been actuated, the stripper plate 24 is carried downward with the ram 17, the springs 26 causing the stripper plate and bolster plate to maintain the spaced relation shown in Fig. 1 during the initial portion of this movement. It will be noted that the upper portion of the upper die section 31 tapers inwardly. This tapered portion is received in an aperture 43, formed in a guide plate 44, which is also tapered, however, to a slightly different degree than the taper of the die section to prevent adherence therebetween when the stripper plate is later moved upward. As the stripper plate moves the guide plate 44 over the upper die section, the guide plate being mounted on the underside of the stripper plate, the upper portion of the die enters the tapered aperture in the guide plate and the die is thereby aligned with respect to the ram 17 and the die sections are clamped together. The upper die section is heated by the plate 44 which is heated by its supporting plate 24, while the lower die section is heated by the base plate 11.

During the first part of the extrusion or injection stroke, the clamping pressure required to hold the die sections together is largely supplied by the springs 26. Thereafter, as the pressure increases in the extrusion chamber, the ram 17 provides the required clamping pressure. The size of the extrusion chamber in the die section 31, and particularly the size of the cross-sectional area thereof, is made large with respect to the size of the horizontal cross-sectional area of the molding cavity so that the pressure exerted by the ram against the molding material in the extrusion chamber tending to force the upper die section downward and to clamp it against the lower die section will exceed the hydrostatic pressure, which is developed by the molding material within the molding cavity and which tends to force the die sections apart to open the cavity, by a substantial margin.

Continued downward movement of the pressure ram 14 then moves the ram 17 relatively to the stripper plate 24 and causes the lower portion of the ram to enter the extrusion chamber formed in the upper die section and to extrude the rubber therein into the chamber. At the same time, the springs 26 are compressed to apply maximum clamping force to the die sections. It will be noted that the upper portion of the wall of the extrusion chamber is rounded slightly along its inner edge to facilitate the entry of the extrusion ram into the chamber. The shell 39 of the part being molded supports the upper die section 31 and, thus, where shells of varying height are used, the size of the molding chamber is automatically adjusted thereby to the required height. Should it be desired to fix the dimensions of the molding chamber or to dispense with the shell 39, a shoulder could be integrally formed at a selected point on the cylindrical portion 33 of the lower die section 30 and the lower end of the wall of the upper die section could be rested thereon during the molding operation.

At the completion of the extrusion operation and after a suitable period of heat treatment to cure the molding material, the ram 14 is reversed and the associated parts moved upward. In order to break the bond which is formed between the extrusion ram 17 and the upper die section by the surplus molding material in the extrusion chamber, two vertically disposed arms 45 which are pivotally mounted on the underside of the fixed cross plate 7 and which, when the bolster plate 15 is in its lower position, are permitted to swing inwardly, being urged inwardly by a pair of springs 46 associated therewith, bear against the upper side of the stripper plate 24 and prevent the stripper plate from moving upward with the ram 17. As may be seen in the drawings, the upper ends of each of these arms are pivotally mounted on pins 48 which are journalled into downwardly extending spaced lugs 49 integrally formed in the underside of a pair of bars 50. The bars 50 are mounted on the underside of the fixed cross plate 7 and, as shown in Fig. 2, are positioned along two opposite sides of the plate 7. An outwardly projecting portion 51 of each arm 45 is provided with a cylindrical recess 52 in which is disposed the lower end of the associated helical spring 46, the upper end of which is received in a similar recess 54 formed in each bar 50. The springs 46 urge the arms 45 inwardly for the purpose hereinbefore explained.

The arms 45 are permitted to bear against the upper side of the stripper plate during the initial portion of the upward movement of the rams 14 and 17. However, as the bolster plate 15 reaches its upper position, the outer edges of the extended portions 19, which are beveled, as shown, to form cam surfaces, engage rollers 57 which are rotatably mounted on stud shafts 58, journalled in each arm 45. As the camming surfaces of the bolster plate 15 engage these rollers, they move the arms 45 outwardly and disengage their lower ends from the upper surface of the stripper plate 24 to permit the stripper plate to be carried upward. This operation is timed so that it occurs just before the upper sides of the extended portions 19 engage the collars 23, fitted on the posts 22 to cause the posts to lift the stripper plate 24. The upward movement of the ram 14 is continued until the stripper plate is elevated above the upper edge of the molding die to permit the molding die to be withdrawn to the left, as viewed in Fig. 1, thus completing a cycle of operation. The inwardly extending portions 42 of the guide plates 40 assist in preventing the mold from being carried upward with the stripper plate 24.

While this invention has been described in connection with the molding of a particular article and using soft rubber, it will be understood that this invention may be used in molding many other types of articles and using other molding materials without departing from the spirit or scope thereof.

What is claimed is:

1. In a molding apparatus, a sectional molding die having a molding cavity and an extrusion chamber formed therein and a passage connecting the molding cavity and the extrusion chamber, a ram receivable in said extrusion chamber for transferring molding compound from said chamber to said cavity, a support for said ram, means for moving said ram vertically, means for supporting said die under said ram, means associated with said ram and movable relatively thereto for applying clamping pressure to said die, resilient means associated with said ram support for urging said clamping means into engagement with said die, means for engaging said clamping means to retain said clamping means in clamping position upon withdrawal of the ram, and means for disengaging said engaging means.

2. In a molding apparatus, a sectional molding die having a molding cavity and an extrusion chamber formed therein and a passage connecting the molding cavity and the extrusion chamber, a ram receivable in said extrusion chamber for transferring molding compound from said chamber to said cavity, a support for said ram, means for moving said ram vertically, means for supporting said die under said ram, means associated with said ram and movable relatively thereto for applying clamping pressure to said die, resilient means associated with said ram support for urging said clamping means into engagement with said die, means for engaging said clamping means to retain said clamping means in clamping position upon withdrawal of the ram, and means for disengaging said engaging means actuated in response to the upward movement of said ram support.

3. A molding apparatus comprising a stationary die supporting base, a sectional removable die having one section resting on said base and a second section supported on the first section, said second section having an extrusion cylinder formed therein, a ram cooperating with said extrusion cylinder, means on said base for locating said die in alignment with said ram, yieldable means carried by and movable with and in advance of said ram for urging said die sections together, and means cooperating with said yieldable means for holding said second die section in position while said ram is being withdrawn from the extrusion cylinder.

4. A molding apparatus comprising a sectional die forming a mold cavity, an extrusion cylinder formed in one of the die sections, a ram operable to extrude molding material from said cylinder to said cavity, means carried by and movable with the ram and in advance of the ram for holding said die sections together, means for resiliently and yieldably mounting said holding means relative to the ram whereby the ram may continue to move into said extrusion cylinder after the holding means engages the die, and means for retaining said holding means in engagement with the die until said ram is withdrawn from the extrusion cylinder.

5. A molding apparatus comprising a sectional die forming a mold cavity, an extrusion cylinder formed in one of the die sections, a ram operable to extrude molding material from said cylinder to said cavity, means carried by and movable with the ram and in advance of the ram for holding said die sections together, means for resiliently and yieldably mounting said holding means relative to the ram whereby the ram may continue to move into said extrusion cylinder after the holding means engages the die, a pair of arms for retaining said holding means in holding position upon the withdrawal of the ram, and means for disengaging said arms when the ram is withdrawn.

6. A molding apparatus comprising a sectional die forming a mold cavity, an extrusion cylinder associated with said die, a ram operable to extrude molding material from said cylinder to said die cavity, a holding plate surrounding said ram for holding the die sections together, means for resiliently and yieldably mounting said holding plate on the ram for movement in advance of said ram whereby the ram may continue to move into said extrusion cylinder after the holding means engages the die, and means for retaining said holding plate in engagement with the die until said ram is withdrawn from the extrusion cylinder.

ANTON J. BRUNNER.